United States Patent [19]

Dacey, Jr.

[11] Patent Number: 4,976,026
[45] Date of Patent: Dec. 11, 1990

[54] METHOD AND APPARATUS OF ESTABLISHING THE POSITION OF A DATUM REFERENCE FROM AN OBJECT HAVING DIMENSIONAL VARIATIONS WITHIN A TOLERANCE RANGE

[75] Inventor: Ernest A. Dacey, Jr., Highland, Mich.

[73] Assignee: Utica Enterprises, Inc., Sterling Heights, Mich.

[21] Appl. No.: 483,958

[22] Filed: Feb. 9, 1990

Related U.S. Application Data

[60] Continuation of Ser. No. 311,166, Feb. 15, 1989, abandoned, which is a division of Ser. No. 59,858, Jun. 8, 1987, Pat. No. 4,813,125.

[51] Int. Cl.$^5$ .............................................. B23P 19/00
[52] U.S. Cl. ...................................... 29/714; 29/712; 29/794; 29/822; 901/6
[58] Field of Search ............... 29/714, 33 K, 464, 430, 29/701, 705, 707, 709, 712, 720, 791, 794, 822, 823; 901/6, 7

[56] References Cited

U.S. PATENT DOCUMENTS 4,553,309  11/1985  Hess et al. ....................... 29/791 X
4,673,075   6/1987  Ueyama et al. ................... 29/791 X Primary Examiner—Joseph M. Gorski
Attorney, Agent, or Firm—Remy J. Van Ophem

[57] ABSTRACT

A device for locating a datum reference on a partially assembled structural object, such as an automobile body frame. The device has a base structure for rigid mounting to a floor member, a transfer platform is attached to the base structure so that the transfer platform has freedom of movement in a first horizontal direction, a support structure is attached to the transfer platform so that it has freedom of movement therewith in a horizontal direction perpendicular to the first horizontal direction, a vertical slide support mechanism attached to the support structure and moveable therewith in a vertical direction, fluid actuated stop members for locking the horizontal and vertical movements of the device when a certain location in space, as dictated by the automobile body, has been attained. A work performing tool attached to the vertical slide support mechanism so that the tool can move into and out of engagement with the automobile body. The method of fixing one or more datum positions as determined by the object being worked on is also disclosed.

8 Claims, 6 Drawing Sheets

METHOD AND APPARATUS OF ESTABLISHING THE POSITION OF A DATUM REFERENCE FROM AN OBJECT HAVING DIMENSIONAL VARIATIONS WITHIN A TOLERANCE RANGE

This is a continuation of application Ser. No. 07/311,166, filed Feb. 15, 1989, and now abandoned, which is a division, of application Ser. No. 059,858, filed June 8, 1987, and now U.S. Pat. No. 4,813,125.

BACKGROUND OF THE INVENTION

1. Field of the Invention

This Invention relates to a device for establishing a datum position from an object having dimensional variations within a tolerance range and holding that datum while work is being performed on the object that generated the datum position. More particularly, the invention relates to a method and apparatus for interaction with a frame-like member, such as an automobile body wherein pre-established variable reference surfaces are detected by the apparatus to establish a datum position. The apparatus then references the datum position and accomplishes work on the automobile body in relationship to the datum position.

2. Description of the Prior Art

An apparatus for assembling a door on an automobile body is set forth in U.S. Pat. No. 4,589,199, which issued May 20, 1986, in the name of Keizaburo Ohtaki et al. In this patent, a set jig is supported on a shift table that is positioned adjacent to an automobile assembly line that can accommodate automobile components, such as the incomplete body structure. The apparatus described in U.S. Pat. No. 4,589,199 is dedicated to the installation of automobile door assemblies to predetermined attachment points that have already been established on the automobile body framework. The set jig can move from front to rear along the automobile body structure. The movement is further enhanced by a three-dimensional right angled coordinate type robot mechanism which is movable with respect to the width and length, as well as the height of the automobile body structure. The robot mechanism is provided on a shift table that has a first movable frame movable in the automobile body length direction, a second movable frame which is provided on the first movable frame and which is movable in the automobile body width direction, and a third movable frame which is provided on the second movable frame and which is movable in the automobile body height direction.

The robot mechanism additionally can support a door assembly and move it into the proper assembly position on the automobile body. In order to compensate for variations in the location of the door attachment points on the automobile body, a probe is moved into engagement with the door attachment point on the automobile body. If the probe detects any deviation in the location of the door attachment point as compared to where it should be, the deviation is communicated through electrical means to the robot mechanism so that it can compensate as it moves the door into an attachment position.

Thus, it can be realized that while the above described apparatus permits automotive body deviations to be taken into account during the assembly of a door, the deviation from the normal attachment point must be first ascertained; then, after the probe has been moved into and out of engagement with the automotive body, the actual task of swinging the door panel into an acceptable attachment location can be undertaken. Then, too, a normal reference point must be established on the assembly line, the automobile body, or both so the probe can successfully calculate the deviation, if any, and communicate such deviation to the three axis positioning portion of the apparatus.

In U.S. Pat. No. 4,086,522, which issued Apr. 25, 1978, in the name of Joseph F. Engelberger et al, a programmable manipulator is described and illustrated. The apparatus set forth in this patent is useful in performing welding functions during the assembly of an automobile body frame. The manipulator relies on a complex electrical program with memory retention capacity to store a series of statically-taught work positions that are acquired from a stationary workpiece.

The computer stored information is then used as a comparison base when the manipulator apparatus is utilized on a moving automobile body assembly line.

Since the manipulator apparatus of U.S. Pat. No. 4,086,522 performs its motion in accordance with an internally retained memory program, it is difficult to control precisely the location of the tool being held by the manipulator end arm. Variations in automobile bodies is a fact and once the body dimensions move outside the range of the pre-recorded deviations, time must be taken to reprogram the memory of the manipulator apparatus so that work on the moving conveyor line can resume. Such a recalibration procedure is costly and time consuming in that the conveyor line must be stopped while the memory means is being reprogrammed.

SUMMARY OF THE INVENTION

According to the present invention, there is provided a device for establishing a datum position from an object having dimensional variations within a tolerance range. The device is then immobilized with respect to the datum position and useful work is then performed on the object with respect to the datum position.

The apparatus of the present invention includes a fixed base structure for rigid mounting to a floor adjacent to an assembly line, a transfer platform movably attached to the base structure so that the transfer platform can move in a horizontal direction with respect to the fixed base structure, a support structure assembly attached to the transfer platform which is adapted to move in a horizontal direction perpendicular to the direction of movement of the transfer platform, a vertical slide assembly movably attached to the support structure assembly and movable therewith in a vertical direction, fluid actuated positioning and locating members attached to the apparatus for immobilizing the horizontal and vertical movements of the apparatus, and a plurality of probes attached to the apparatus for locating pre-established variable reference surfaces from which the datum position is established.

The invention also encompasses a work performing tool attached to the apparatus so that it can perform work on the object from which the datum position is established.

The method of establishing one or more datum positions as determined by the variations in the object upon which the work is to be performed is set forth. The method also encompasses the performance of work on an object at a location remote from a plurality of independently established reference positions.

A principal object of the present invention is to provide a new and improved apparatus for locating a relatively imprecisely located reference position relating to an object undergoing assembly.

Another object of the present invention is to provide a new and improved apparatus that is easy to construct and manipulate while providing a rapid technique for locating a datum position in space and accomplishing work at a location remote from the datum position but in relationship thereto.

A further object of the present invention is to provide an apparatus that has an extended service life and yet is easy to repair and maintain.

Still another object of the present invention is to provide an apparatus that can interact with a vehicle body element and select a given reference position with respect thereto and establish and maintain a reference datum relative thereto while work is performed on the vehicle body element.

An additional object of the present invention is to provide a method and apparatus for locating a plurality of reference positions with respect to a vehicle body element to establish a datum reference position and accomplishing work on the vehicle body element at a location remote from the datum position.

Another object of the present invention is to provide an apparatus that relies primarily on fluid drive means for accomplishing part of its motion relative to an adjacent workpiece.

Also, another object of the present invention is to provide an apparatus that has freedom of movement in three axes to establish a datum reference yet is relatively safe for incorporation into an assembly line environment.

Another object of the present invention is to provide a method for the manufacture of attachment sites on a vehicle body structure that is being carried by an assembly line.

A further object of the present invention is to provide a method for the positioning of attachment sites to an automobile body structure by referencing one or more datum positions on the body structure.

Yet another object of the present invention is to provide an apparatus that has incorporated therewith a work tool responsive to a datum position that has been located and held by the apparatus for a time interval sufficient to permit the tool to accomplish its task and be withdrawn from the proximity of the object being worked on.

DETAILED DESCRIPTION OF THE PREFERRED EMBODIMENT

Figure 1:
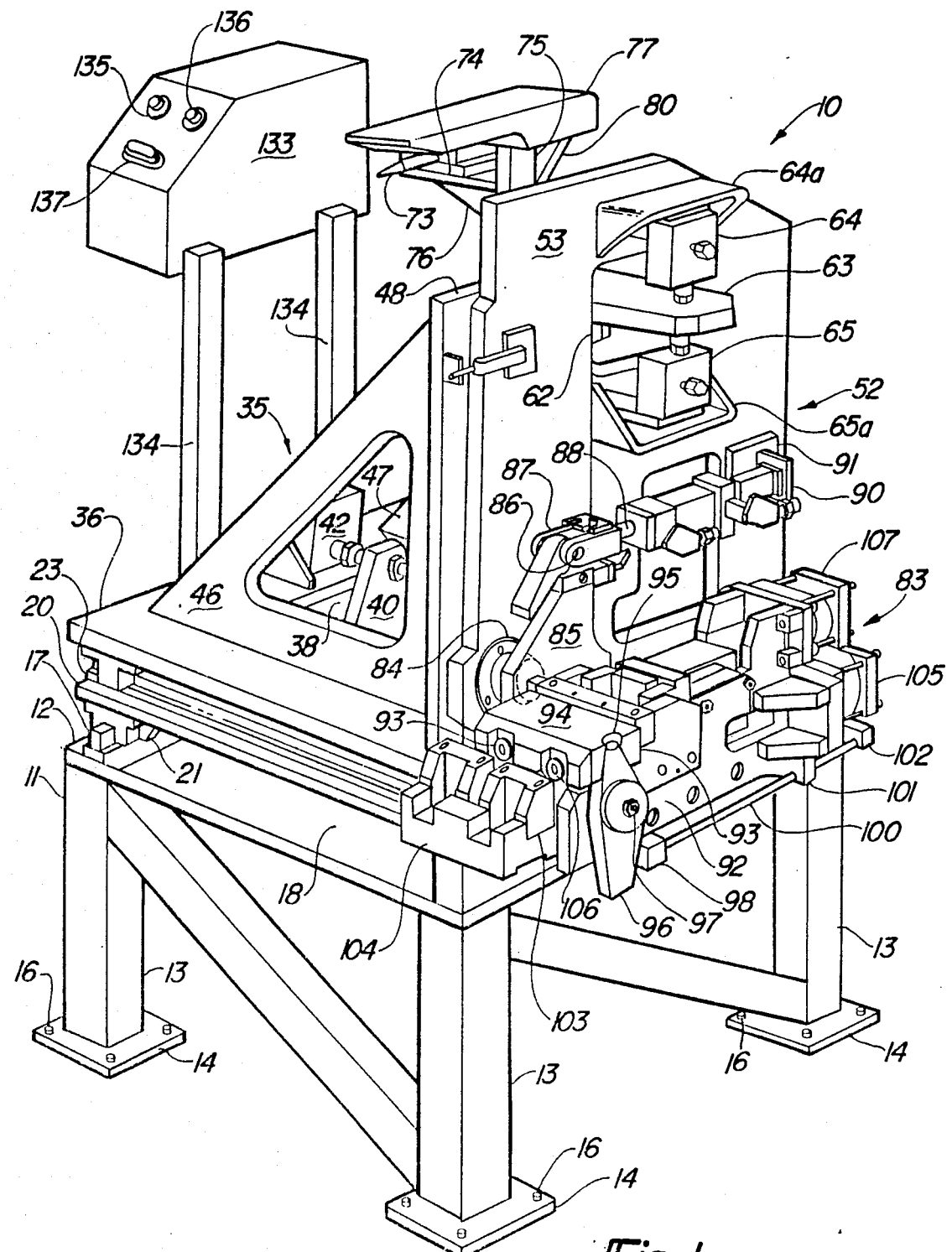
FIG. 1 is a perspective view of a preferred embodiment of the apparatus according to the present invention.

Referring now to the drawings and more particularly to FIGS. 1 through 8, there is shown an apparatus for establishing a datum from an imprecisely positioned vehicle framework. The overall apparatus, as viewed in FIG. 1, is referenced by the reference character 10. The apparatus 10 has a base structure 11, that has a generally planar top plate 12. The planar top plate 12 is mounted in a horizontal attitude and is supported by vertically aligned support legs 13. The support legs 13 terminate at their lower extremity with support pads 14. In order to provide a stable and relatively immobile structure, the support pads 14 are anchored to a floor 15 by appropriately designed anchor fasteners 16. A pair of slide rails or ways 17 parallel to each other are attached to a top surface 18 of the planar top plate 12. The slide rails 17 can be securely attached to the top plate 12 by any number of ways such as welding or appropriate fasteners, such as bolts. The slide rails 17 can be seen more clearly in FIG. 2.

A transfer platform 20 is positioned above and in spaced relationship to the planar top plate 12 of the base structure 11. The transfer platform 20 has a plurality of bearing pads 21 attached to the bottom side thereof. The bearing pads 21 are arranged in spaced apart pairs and each pair of bearing pads 21 is positioned so as to interact with one of the slide rails 17. Thus, it can be seen that the transfer platform 20 has one degree of horizontal movement that is substantially parallel to the planar top plate 12 of the base structure 11. The horizontal movement of the transfer platform 20 shall hereinafter be referred to as that horizontal movement that is perpendicular to the direction of travel of an automobile assembly line.

The transfer platform 20 is coupled for movement with respect to the top plate 12 by a fluid driven piston type actuator 25. The body portion of the actuator 25 is mounted rigidly to the top surface 18 of the planar top plate 12. The terminal end of an actuator push rod 26 is attached to a positioning bar 27 which is in turn suspended in part between work supports 28 and 30 of a known type, i.e, Hytec Hydraulic Work Support No. 100226. The actuator 25 has fluid egress lines to both sides of the piston therein, thus, enabling the piston or push rod to be extended or withdrawn with respect to the actuator housing. Thus, it can be ascertained that the transfer platform 20 can move back and forth in a horizontal direction along the pair of slide rails 17 under the influence of the actuator The transfer platform 20 is essentially planar and rectangular in configuration and in addition to the bearing pads 21 it contains on the bottom side thereof, it has a second set of slide rails 23 attached by appropriate fasteners to the top surface. The second set of slide rails 23 are in parallel orientation with one another and are aligned perpendicular to the slide rails 17 upon which the bearing pads 21 move.

Figure 2:
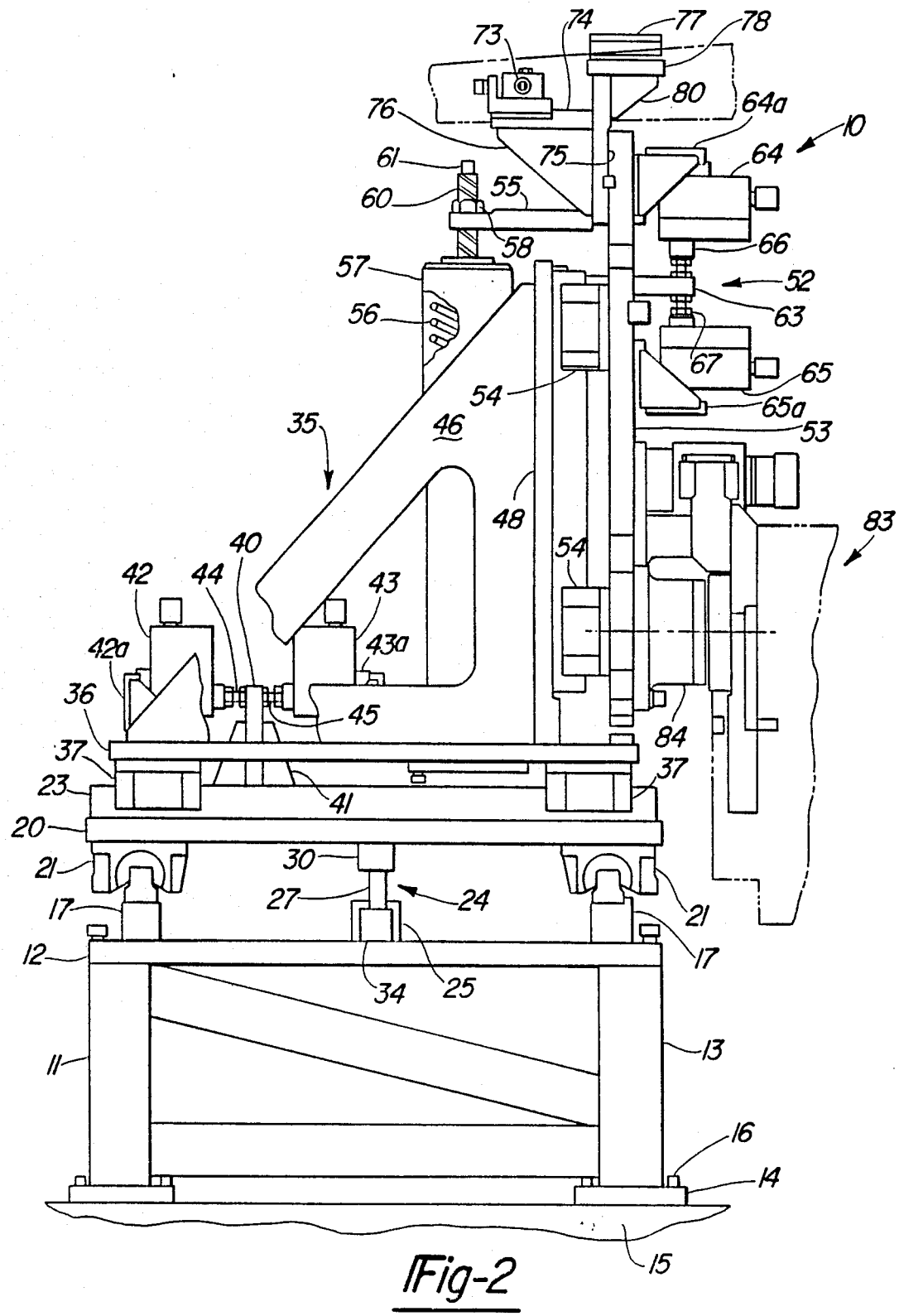
FIG. 2 is a front elevational view of the apparatus that shows a work tool in phantom at the right side of the depicted apparatus.
Figure 3:
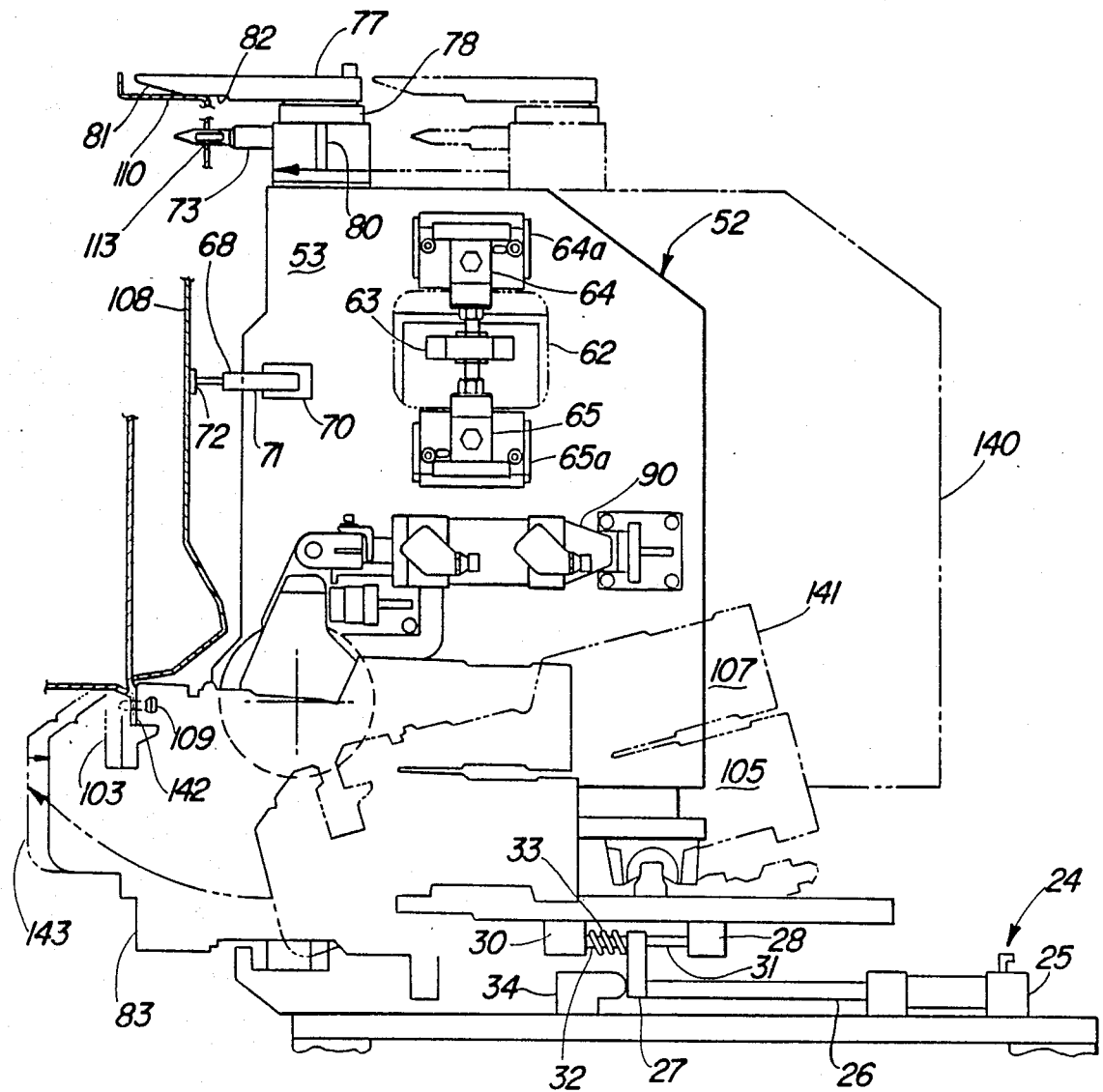
FIG. 3 is a side elevational view of the apparatus that shows a portion of an automobile body section at the left of the drawing. The degree of movement of the apparatus is also shown in dotted lines.

Referring to FIGS. 2 and 3, a motion control assembly 24 is located between the planar top plate 12 of the base structure 11 and the transfer platform 20. The motion control assembly includes the fluid driven piston type actuator 25 that is in alignment with the pair of slide rails 17 and is anchored to the top surface 18 of the top plate 12. As previously mentioned, the fluid driven actuator 25 is equipped with a bi-direction push rod 26 to which is fastened a positioning bar 27. The positioning bar 27 is cantilevered in a vertical direction so that its free end is located between the work supports 28 and 30, which are attached to the bottom of the transfer platform 20. The work support 28 has a fluid actuated push rod 31 and the work support 30 likewise has a fluid actuated push rod 32. The push rod 31 of the work support 28 is in abutting relationship against one side of the positioning bar 27 and the push rod 32 of the work support 30 is in abutting relationship with the other side of the positioning bar 27. A compression spring 33 is mounted coaxial with the push rod 32 so that its ends abut the housing of the work support 30 and the positioning bar 27 to at all times create a biasing force therebetween. A fixed stop 34 is attached to the planar top plate 12 in alignment with the actuator 25. The end of the fixed stop 34 abuts against one side of the positioning bar 27 when the device is locked in position after the datum position is established. The various components of the motion control assembly 24 have been set forth above. The actual operation and function of the motion control assembly 24 will be described hereinafter.

A support structure assembly 35 is coupled to the transfer platform 20 in the following manner. The support structure assembly 35 has an apertured bottom plate 36 that is of comparable size to the transfer platform 20. Two sets of bearing pads 37 are attached to the bottom surface of the bottom plate 36. The bearing pads 37 are in alignment and coact with the slide rails 23 which are mounted to the transfer platform 20.

Figure 4:
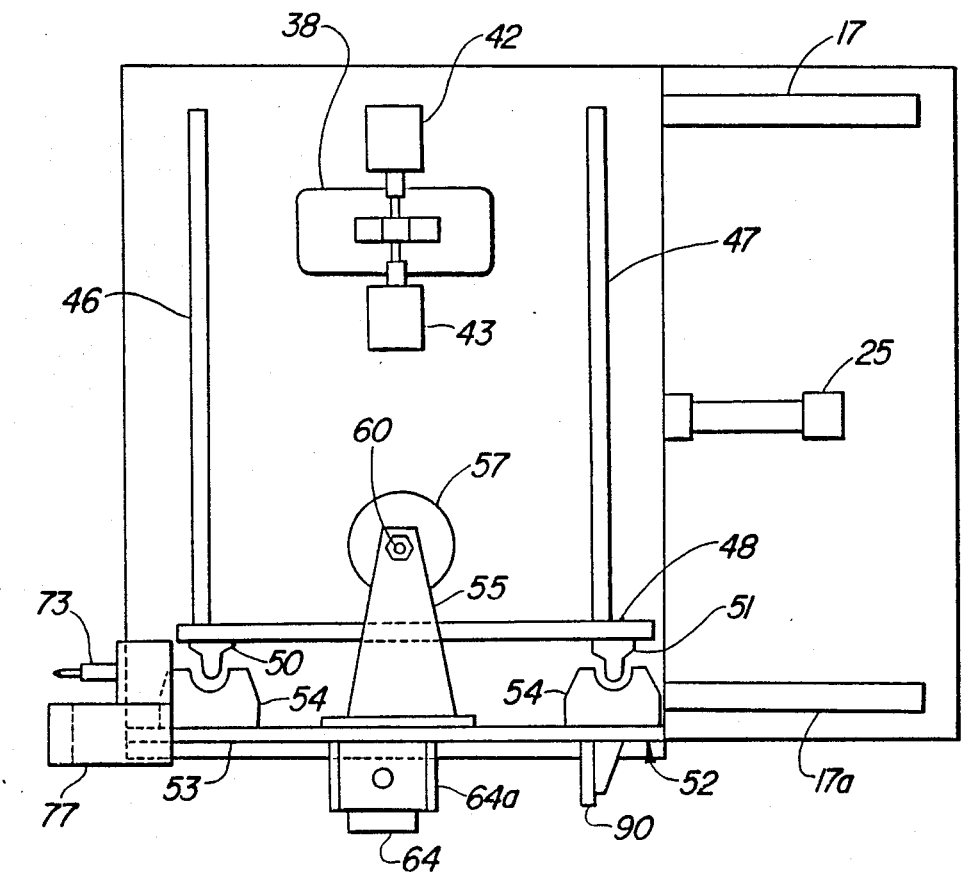
FIG. 4 is a plan view of the apparatus as shown in FIGS. 1 through 3, that shows the counterbalance and the aperture in the transfer platform.

The bottom plate 36 contains an aperture 38, as shown in FIGS. 1 and 4, that permits a positioning plate 40 to protrude therethrough. The positioning plate 40 is firmly anchored to the top surface of the transfer platform 20. Gussets 41 help to stabilize the positioning plate 40. The aperture 38 is of such a size that it provides a certain degree of movement of the bottom plate 36 without interfering with the positioning plate 40. A pair of work supports 42 and 48 are attached to the top surface of the bottom plate 36 by means of brackets 42a and 43a in opposed relationship to one another. The cantilevered end of the positioning plate 40 is mounted between fluid actuated push rods 44 and 45 of the work supports 42 and 43.

The support structure assembly 35 has a limited degree of movement afforded by the interaction between the positioning plate 40 and the coacting and opposed work supports 42 and 43. The actual movement of the support assembly 35 will be explained in more detail hereinafter. The bottom plate 36 of the support structure assembly 35 has two spaced apart vertical supports 46 and 47. The vertical supports 46 and 47 are attached to the top surface of the bottom plate 36. In addition to being oriented parallel to one another, the vertical supports 46 and 47 provide stabilization for an apertured vertically aligned support plate 48. The lower edge of the support plate 48 abuts against the top surface of the bottom plate 36 and is welded or in any convenient way fastened thereto.

As can be seen in FIG. 4, the vertically aligned support plate 48 has attached thereto a pair of slide rails 50 and 51. The slide rails 50 and 51 are attached to the support plate by bolts (not shown).

Referring once again to FIGS. 2 through 4, a vertical slide assembly 52 is placed adjacent and in approximate alignment with the support plate 48. The vertical slide assembly 52 includes a mounting plate 53 that supports two pairs of bearing pads 54. The bearing pads 54 are positioned so as to coact with each of the slide rails 50 and 51. The bearing pads 54 are firmly attached to the mounting plate 53 in a manner so that the vertical slide assembly 52 can move up and down with respect to the support assembly 35 in an unimpeded manner along the slide rails 50 and 51.

The vertical slide assembly 52 and the various components that are attached thereto represents a considerable amount of mass, therefore, it is necessary to provide some means to overcome the effects of the weight of the vertical slide assembly 52. To obtain this objective, an upper support plate 55 is positioned in alignment and attached to the mounting plate 53. A counterbalance in the form of a compression spring 56 is utilized to overcome the effects of the mass of the vertical slide assembly 52. Of course, there are additional ways to counterbalance the vertical slide assembly 52, all within the understanding of those skilled in the art. A spring housing 57 is positioned adjacent to the vertically aligned support plate 48 and attached to the bottom plate 36. An internally threaded nut 58 is attached to the support plate 55 near the free end thereof. An externally threaded rod 60 engages with the threaded nut 58 and extends in a vertical direction on both sides of the threaded nut 58. The bottom end of the threaded rod 60 is attached to a cylindrical loading pad (not shown) that is positioned within the spring housing 57 and on top of the compression spring 56 so that the total weight of the vertical slide assembly 52 bears on the compression spring 56 which acts as a counterbalance. The adjustment of the compression spring so that it can perform its intended purpose is accomplished by adjusting the top end 61 of the threaded rod 60.

With reference to FIGS. 1 through 4, an aperture 62 is positioned in the upper portion of the mounting plate 53. A positioning plate 63 is rigidly attached to the top portion of the support plate 48. The positioning plate 63 is generally perpendicular to the support plate 48 and it extends in a direction through the aperture 62 of the mounting plate 53. A work support 64 is attached to the mounting plate 53 by means of a bracket 64a so that a movable push rod 66 is aligned with the free end thereof in contact with the top surface of the positioning plate 63. A second work support 65 is attached by means of a bracket 65a to the mounting plate 53. The work support 65 is in alignment with the work support 64 in that its push rod 67 is directly opposite the push rod 66 with only the positioning plate 63 being therebetween. The function of the work supports 64 and 65 will be explained hereinafter.

The mounting plate 53 supports three probes, each one having defined reference points substantially along each of the major axes, the reference points varying within specified limits corresponding to a major axis of a three-dimensional object. For example, an automobile body has a first axis that traverses the front to rear direction. A second axis, which is perpendicular to the front to rear axis, traverses the side to side direction or inboard/outboard direction. A third axis is a vertical axis which is perpendicular to each of the previously mentioned axes and represents an up and down direction.

The mounting plate 53, as shown in FIG. 3, has attached thereto a probe 68 to detect a surface position in the inboard/outboard direction or side-to-side direction. The probe includes a mounting pad 70, an elongate shaft 71 and an automobile body contact pad 72. A probe 73 for sensing the position of a surface reference in the front to rear direction can be seen at the top of FIGS. 1 through 4. The front to rear probe 73, which will hereinafter be referred to as the longitudinal probe, is attached to a horizontally disposed plate 74 that in turn is attached to an intermediate plate 75. The intermediate plate 75 is securely attached to the mounting plate 53 of the vertical slide assembly 52 by bolts which are not shown. A gusset 76 for stabilizing the plate 74 is shown in FIG. 2. A probe for sensing the position of a surface reference in the vertical direction is hereinafter referred to as the vertical probe 77. The vertical probe 77 is attached to a plate 78 which is in turn attached to the top of the intermediate plate 75. A gusset 80 helps to stabilize the vertical probe 77. In FIG. 3 it can be observed that the vertical probe 77 has a tapered surface 81 and a flat surface 82. The tapered surface 81 permits the vertical probe 77 to climb vertically onto a surface in order to have the flat surface 82 seat onto an automobile body part which is substantially horizontally disposed.

Referring to FIGS. 1 and 2, there is shown a form and pierce assembly 83 that is attached to the overall apparatus 10. The form and pierce assembly is more fully described in copending patent application Ser. No. 810,045, entitled Method and Apparatus for Body panel Attachment. A bearing support hub 84 is bolted to the mounting plate 53 of the vertical slide assembly. The bearing support hub 84 contains an internal bore that contains a heavy duty bushing and bearing arrangement (not shown). The bearing support hub 84 is attached to the side of the form and pierce assembly 83. A pivot arm 85 is pivotally attached to the bearing support hub 84 and contains a pivot point to accommodate a pivot pin 86. A clevis 87 cooperates with the pivot pin 86 to rotate the pivot arm 85 and the form and pierce assembly 83. The clevis 87 is attached to the end of an actuator rod 88 of a fluid actuator 90. The fluid actuator 90 is in turn anchored to the mounting plate 53 by means of a mounting bracket 91. Thus, it becomes evident that as the actuator 90 causes the actuator rod 88 to move, the clevis 87 and its applied moment force will rotate the pivot arm 85 as well as the form and pierce assembly 83 that is supported by and attached to the pivot arm 85.

The form and pierce assembly 83 will be briefly described hereinafter so that its function with respect to the overall apparatus 10 may be understood. A detailed structural and operational description of the form and pierce assembly is found in the above referenced compending application and is specifically incorporated herein by reference.

The pivot arm 85 is attached to one of two side plates 92, thus, permitting the entire form and pierce assembly 83 to pivot about the bearing support hub 84 under the influence of the fluid actuator 90. The side plates 92 are spaced apart and are parallel to one another. A pair of fixed anvils 93 are rigidly attached by way of a mounting plate to the side plates 92. While the actual attachment of the fixed anvils 93 is not shown, the work surfaces of the fixed anvils 93 are shown in FIG. 1. A floating cross member or arm 94 is positioned in sliding arrangement with respect to the side plates 92. The floating cross member or arm 94 contains vertically aligned grooves 95 in the ends thereof. The end of a bell crank 96 is positioned so that the upper extremity thereof fits into the groove 95 of the cross member 94. The bell crank 96 pivots about a fixed attachment point 97 that is anchored to the side plate 92. While only one bell crank 96 can be clearly seen in FIG. 1, two are utilized so that the cross member 94 can be evenly biased. The lower end of each bell crank 96 is attached to a croas bar 98 that ties the bell cranks together so that they work in unison. A pair of rods 100 are attached to the cross bar 98. The rods 100 are spaced apart and attached to both ends of the cross bar 98. The rods 100 are slidably supported by apertured brackets 101 which in turn are fixed to the side plates 92. The ends of the rods 100 most remote from the bell cranks 96 are attached to an abutment bar 102. The cross bar 98, the rods 100 and the abutment bar 102 form a yoke-like movable unit adapted for movement as dictated by the bell cranks 96. While not shown in the drawings, the abutment bar 102 rests against the movable shafts of a pair of work support apparatuses. The form and pierce assembly contains a movable anvil 103 for coaction with the fixed anvils 93. While two such fixed anvils 103 are shown, the form and pierce assembly 83 could operate equally well with a single anvil system or more than two anvils. The movable anvils 103 are fixed to a common slide bar 104 that is supported in part by the side plates 92. The end of the slide bar 104 remote from the movable anvils 103 is attached to a movable rod of a fluid actuated actuator 105. The fixed anvil 93 is fabricated with a centrally positioned aperture 106 for coaction with at least one pierce tool 109, as illustrated in FIG. 3. The pierce too has reciprocal motion afforded through the movement of the actuator rod of a fluid actuator 107.

Figure 5:
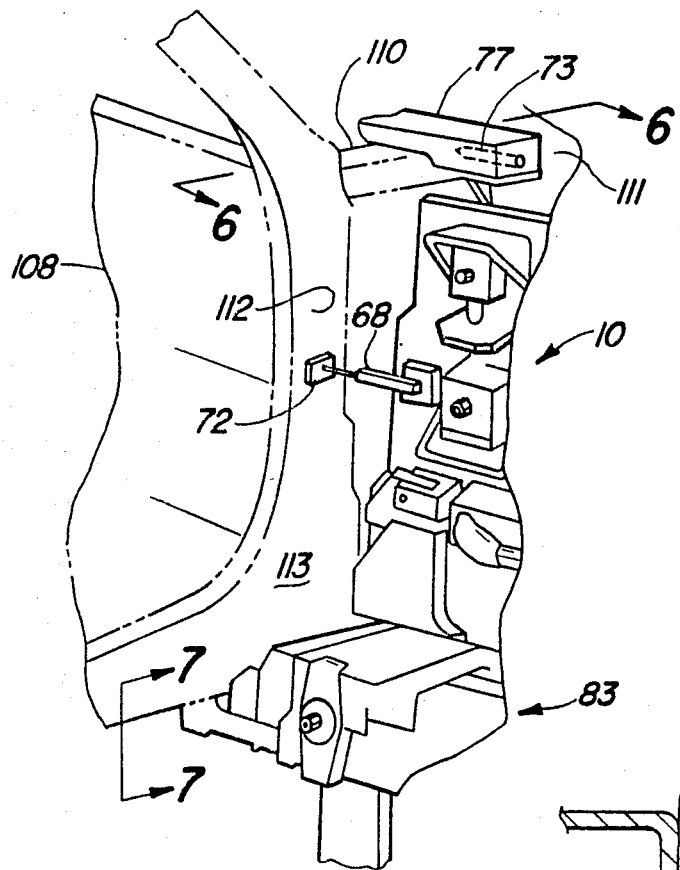
FIG. 5 is a perspective sectional view of a portion of an automobile body that shows typical reference points on the body surfaces.

FIG. 5 shows a perspective view of a portion of the overall apparatus 10 as it coacts with an automobile body 108. The automobile body 108, which is shown in broken lines, represents the front door area on the right-hand (passenger) side of the automobile, the front of the automobile body 108 is to the right of FIG. 5. The vertical probe 77 is shown as it rests on top of a section of the automobile body framework 110 that is adjacent the hood (fender). As the vertical probe rests against its final surface position, the front to rear probe 73, which is shown in dotted lines, has found its locating or surface position 111 within the automobile framework adjacent to the fender. The third axis, that is the side to side axis or inboard/outboard position, is determined by means of the side to side probe 68 which rests against a front door pillar section of the body framework 112 that is adjacent to the door panel. The form and pierce assembly 83 is shown in its final position where it has established a datum position from which work on the lower edge of an automobile body panel 113 is performed.

Figure 6:
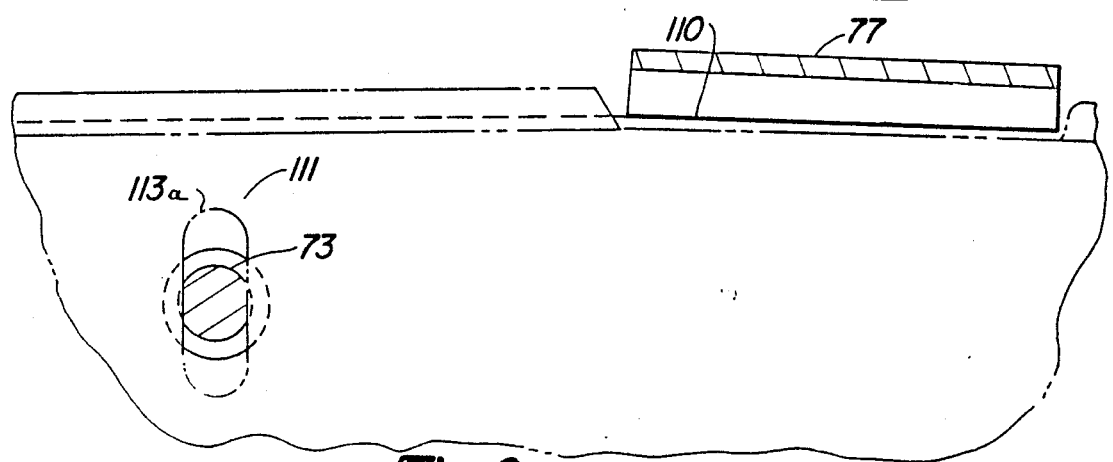
FIG. 6 is an enlarged view taken along lines 6—6 of FIG. 6 which shows two of the work points on the automobile body.

FIG. 6 is a view taken along lines 6—6 of FIG. 5 which shows an enlarged view of the interaction between the vertical probe 77 and the front to rear or longitudinal probe 73. The vertical probe 77 may be finally adjusted by means of shims (not shown) until its lower surface matches the contour of the body panel or framework 110. The front to rear probe 73, which has the configuration of a rod with a tapered end with a flat edge, is shown in engagement with the flat edge of an orifice 113a that has been placed in the automobile body at the surface position 111. The orifice 113a is elongated in configuration so that the front to rear probe 73 can move in a vertical direction, yet its longitudinal direction, front to rear of the automobile body, is closely held because of the flat surface and, therefore, restricted width of the orifice 113a. As has been previously pointed out, the vertical probe 77 has a tapered or inclined surface 81 adjacent its terminal end. The inclined surface permits the vertical probe 77 to elevate itself as it slides into final position on the top surface of the body framework 110.

Figure 7:
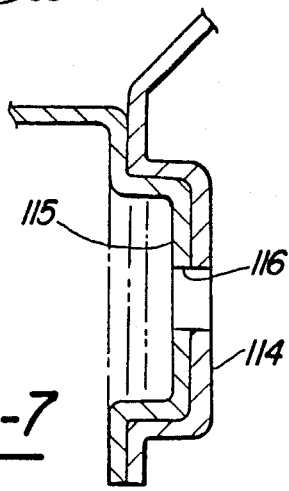
FIG. 7 is a view taken along lines 7—7 of FIG. 5 that has been cross-sectioned to show the work that has been accomplished on an automobile body flange.

FIG. 7 is a view of the automotive body looking along lines 7—7 of FIG. 5 that shows a fragmentary view, partly in section, of the automobile body 108 after a portion thereof has been worked upon by the form and pierce assembly 83. A boss 114 has been created towards the exterior of the automobile body and a corresponding reentrant portion 115 has been formed in the interior body sheet metal. The coining of the automobile body 108 has been accomplished by the action of the fixed anvil 93 in cooperation with the movable anvil 103 of the form and pierce assembly 83. In addition to the coining operation performed by the form and pierce assembly 83, an orifice 116 has been created in the center of the boss 114 by the pierce mechanism contained within the form and pierce assembly 83, providing an attachment for the outer fender panel.

Figure 8:
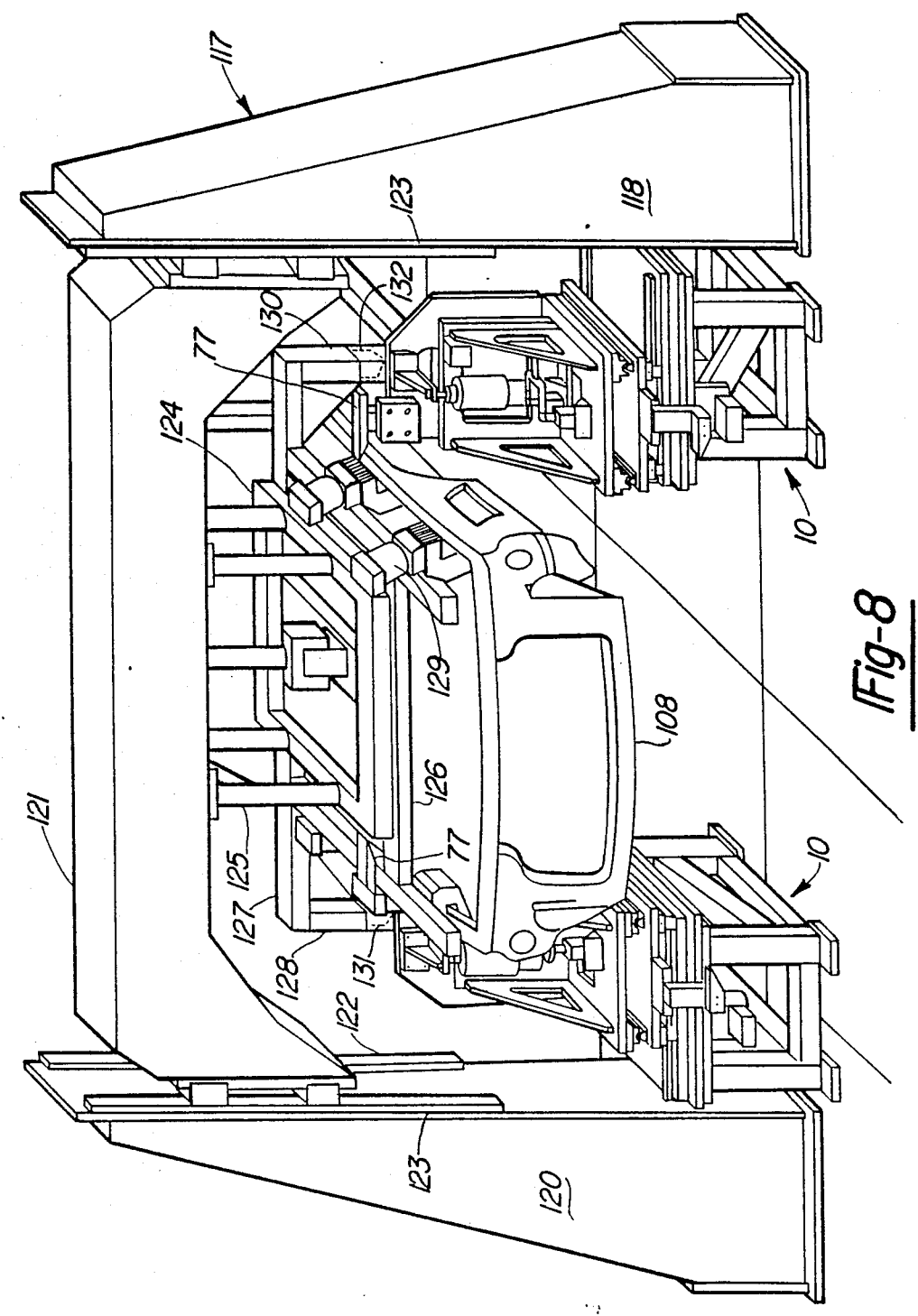
FIG. 8 is a perspective view that shows an automobile body that is being worked on by the apparatus of the present invention.

FIG. 8 is a perspective view of a segment of an automobile assembly line that shows an automobile body and how it interacts with the apparatus of the present invention. FIG. 8 shows an automobile body 108 as it is transported by a carrier means (not shown) along an assembly line. A positioning apparatus 10, as described above, is located on each side of the automobile body 108 such that each apparatus 10 can move into and out of engagement with the automobile body 108. A gantry assembly 117 spans the entire automobile body as well as the apparatuses 10. The gantry assembly 117 includes two columnar members 118 and 120 that are positioned at the same station of the assembly line. A bridge member 121 spans the distance between the columnar members 118 and 120. The bridge member 121 is adapted to move up and down along the guide rails 122 and 123 which may be accomplished by any of several well known ways familiar to those skilled in the art. A rectangular support framework 124 is attached, in spaced relationship, to the bridge member 121 by means of posts 125. A tool framework 126 is pivotally attached to the support framework 124. While the details of the actual attachment between the tool framework 126 and the support framework 124 are not shown, such coupling would be readily apparent to those skilled in the art. The tool framework 126 has the freedom to rotate about a vertical axis, shift along the front to rear axis, as well as shift along the side to side axis and rotate about the front to rear axis. The support framework 124, however, is restricted in rotation about the side to side axis. A positioning bar 127 is attached to the rear of the tool framework 126. The positioning bar 127 is cantilevered at both ends so as to extend beyond the automobile body 108. Positioning posts 128 and 130 are attached to the respective ends of the positioning bar 127. The positioning posts 128 and 130 are in vertical alignment and parallel to one another. A ball and socket arrangement 131 and 132 is affixed to the bottom end of each of the positioning posts 128 and 130. A reentrant receiver portion is attached to each of the positioning apparatuses 10 so that the probe-like ball and socket arrangements 131 and 132 can fit therein. The reentrant receiver portion that is attached to the respective apparatuses 10 may not have identical positions in space with respect to height, distance from the centerline of the assembly line conveyor, and the front to rear direction once they are in position as dictated by the automobile body 108. Thus it becomes evident that the tool framework 126 can be positioned to do work on the automobile body 108 even though the ball and socket arrangements 131 and 132 do not occupy corresponding similar positions on either side of the assembly line. The tool framework 126 has attached thereto a plurality of tools 129, such as form and pierce assemblies or drills as the application may dictate. The tools operate under principles that need not be described herein.

OPERATION

During the operation of an automotive assembly line, the components, such as automobile bodies, move in seriatim as work is performed at various work stations on each automobile body. The ideal assembly line would move in a linear path and the exactly symmetrical automobile bodies would move along the assembly line while tools spaced remote from the linear path of the assembly line would perform the exact task on each automobile body on the assembly line.

In actual practice, it is well known that all automobile bodies are not identical, in fact, in many instances individual automobile bodies are not symmetrical in configuration from side to side. Then too, the automobile body may not be mounted on the assembly line carrier so that the front to rear axis of the automobile body is not coincident with the linear centerline of the assembly line.

The method and apparatus of the present invention sets forth a way to compensate for the inevitable variations that occur on the assembly line in order to provide attachment points for outer panels which will provide a precise fit between adjacent panels. For example, it is important that the exterior automobile body panel lines closely match each other, that is, the hood should match with each of the front fenders so that a smooth body exterior results as well as exacting closely controlled gaps between panels exist.

During the operation of the assembly line, an automobile body 108, as depicted in a fragmentary section in FIG. 3, is moved into juxtaposed position beside the overall apparatus 10. While it is customary to perform the work tasks on both sides to the automobile body at the same work station, the following discussion will be directed to only one side of the automobile body, that is, the righthand (passenger) side.

Referring to FIG. 1, a control console 133 is positioned adjacent to and supported by upright members 134. As is common with the majority of today's machinery, the movement of the various components of the machinery is sequentially controlled by electrical means well known to those skilled in the art, therefore, the actual electrical and hydraulic control circuits will not be described herein. The control console 133 has an on switch 135 and an off switch 136 as well as an emergency button 137. Various micro-switches and other sensors are also employed, but are considered as ordinary. The actuators herein mentioned are fluid driven, that is, hydraulic in nature, however, pneumatically driven actuators are considered to be within the scope of the present invention. The actual fluid delivery lines have not been shown in the drawings.

As an automobile body 108 is positioned next to the overall apparatus 10, the on switch 135 is actuated and fluid is directed to the actuator 25, thus, causing the push rod 26 to move to an extended position first in a quick traverse mode followed by a deceleration mode. The positioning bar 27 rests against the compression spring 33, which in turn transmits its force to the housing of the work support 30. The entire transfer platform 20 and all that is supported thereon is urged rapidly toward the automobile body 108 until a deceleration mode is reached whereat the inclined surface 81 of the vertical probe 77 makes contact with the surface reference of the automobile body framework 110. The entire vertical slide assembly 52 is raised as the inclined surface of the vertical probe advances in a horizontal direction to climb the surface of the automobile body framework 110 under the influence of the actuator 25. As the vertical slide assembly 52 is being raised to permit the flat surface 82 of the vertical probe to set upon the surface reference of the body framework 110 to establish an up and down location, the leading point of the front to rear probe 73 is being guided into position within the orifice 113a of the locating position 111 against the flat reference surface to establish a longitudinal location. The front to rear probe 73 can correct its front to rear attitude because the entire support structure assembly 35 can move on the slide rails 23. The support structure assembly is not actuator powered but, rather, its motion from front to rear is governed solely by the horizontal biasing force exerted on the front to rear probe 73 as it enters the orifice 113a. The orifice 113a is elongate in configuration so that the vertical travel of the vertical slide assembly 52 will not be impeded. As the longitudinal probe 73 and the vertical probe 77 move into final position, the contact pad 72 of the side to side probe 68 abuts against the body framework 112 to establish a third reference position and thereby complete the datum position established by the cooperation of the vertical, longitudinal and side to side probes. Continued extension of the push rod 26 of the actuator 25 causes the force of the compression spring 33 to be transmitted directly to the automobile body framework 112. To avoid undue force from being applied to the body framework 112, the fixed stop 34 counteracts any undue force exerted by the actuator 25. Then, too, the positioning bar is held in a rigid manner to be explained later. The vertical slide assembly 52 has a substantial amount of mass which is counterbalanced through the action of the compression spring 56. However, not all of the mass of the vertical slide assembly is offset against the compression spring 56. The vertical slide assembly 52 counterbalance is set so that there will be a minimum of weight to be lifted in the vertical direction by the vertical probe 77 as it climbs into the final position on the body framework 110 in order to ensure continuous contact of the vertical probe with the reference surface.

During the positioning of the three probes discussed above, the work supports 28 and 30, the work supports 42 and 43, and the work supports 64 and 65 have been free to follow the movement of its respective positioning bar or plate. All of the just mentioned work supports are interconnected to a common fluid pressure source. As pressure is introduced to the work supports 28 and 30 their respective push rods 31 and 32 are prevented from axial movement and impinge against the positioning bar 27 which is already immobilized firmly against the fixed stop 34. Thus, the transfer platform 20 is immobilized with respect to the top plate 12 of the base structure 11.

The simultaneous pressurization of the lines connected to the work supports 42 and 43 causes their push rods 44 and 45 to adapt a clamping action against the positioning plate 40 which in turn is anchored to the transfer platform 20 thereby immobilizing the support structure assembly 35. The clamping action afforded by the work supports 42 and 43 immobilizes the support structure assembly 35 with respect to the transfer platform 20. When pressure is introduced to the work supports 64 and 65, their respective push rods 66 and 67 exert an equal biasing force on both sides of the positioning or clamp plate 63. Since the clamp plate 63 is attached to the support structure assembly 35, the vertical slide assembly 52 is immobilized with respect to the support structure assembly 35.

Thus, it becomes evident that a datum position in space, as dictated by the probe locations on the juxtaposed automobile body framework, is established by the overall apparatus 10. The integrity of the datum position in space is established with such a magnitude that working forces on the automobile body 108 will not cause a shift of the established datum position in space.

Attention is now directed to FIG. 3 which is a side view of the overall apparatus 10, but also, of the form and pierce assembly 83. At the beginning of the operational cycle of the overall apparatus 10, it is at a position most remote from the side of the automobile body 108. The mounting plate 53 of the vertical slide assembly assumes an initial starting position as, depicted by the broken line 140. Likewise, the form and pierce assembly 83 has an initial starting position, as depicted by the broken line 141. In addition to being at its most rearward position, the form and pierce assembly 83 is rotated in a counterclockwise direction under the influence of the fluid actuator 90 attached to the pivot arm. The form and pierce assembly 83 maintains its counterclockwise tilted position until the overall assembly 10 has established its three axis datum position from the automobile body 108. After the plurality of work supports have been pressurized by a common fluid source, thus, immobilizing the entire overall apparatus 10, the actuator rod 88 of the fluid actuator 90 is retracted, thus, causing the form and pierce assembly 83 to rotate in a clockwise direction as viewed in FIG. 3. The clockwise rotation of the form and pIerce assembly 83 to an approximate horizontal attitude permits the movable anvil 103 to clear a lower flange 142 of the automobile body 108. After the movable anvil 103 has moved into position interiorly of the lower flange 142, the cross member 94 which is just exterior of the lower flange 142, floats into position so that it rests lightly against the exterior surface of the lower flange 142. Subsequent to the contacting of the exterior surface of the lower flange 142 by the cross member 94, the cross member is immobilized in position through a pair of opposed work supports (not shown) that apply their respective force to the abutment bar 102. With the cross member 94 dictating the position of the lower flange 142 to the form and pierce assembly 83, the fluid actuator 105 is actuated, thus, causing the movable anvil 103 to move from a fully extended position, as depicted by broken line 143, to a closed position. The closing of the movable anvil 103 against the fixed anvil 93 (FIG. 1) results in the desired deformation of a select portion of the lower flange 142. After the anvils 93 and 103 have immobilized the deformed area of the lower flange 142, the pierce tool 109 is actuated by means of the actuator 107. The pierce tool 109 pierces the deformed area of the lower flange 142. The pierce tool 109 is withdrawn, the movable anvil 103 is extended to its outermost position, the fluid pressure to the opposed work supports that coact with the abutment bar 102 is released, and the entire form and pierce assembly 83 is rotated in a counterclockwise direction, as viewed in FIG. 3, under the influence of the actuator 90.

The actuator 25 is reversed such that the push rod 26 is contacted, thus, causing the transfer platform 20 to move in a direction away from the automobile body 108. After the longitudinal probe 73 and the vertical probe 77 have cleared their respective reference surfaces on the automobile body 108, the fluid pressure to all of the work supports is released. The support structure assembly 35 once again becomes free floating and the vertical slide assembly 52 drops to its lowermost position under the influence of gravity. The load stored in the compression spring 33 is released as the fluid pressure to the work supports 28 and 30 is relaxed. The overall assembly 10 returns to its original position, as depicted by broken line 140, and the cycle is set for the operation to begin on the next automobile body after it has advanced along the assembly line into position for work to be performed on it.

The gantry assembly 117, as shown in FIG. 8, represents an adaptation of the invention that has heretofore been described. The entire objective of the invention is to utilize certain surface references as found on each individual automobile body assembly and establish a datum position from which work can be performed on the automotive body. The surface references can vary from body assembly to body assembly and even from side to side of the same automobile body. The gantry assembly 117 permits asymmetrical datum positions to be used in the location of fastening points for automobile body exterior panels, such as fenders, hoods, trunk lids, rear and front bumper assemblies and the like. The gantry assembly 117 utilizes an overall apparatus 10 on the righthand side of the automobile body 108 as well as the lefthand side. Each one of the overall assemblies utilize information acquired from the automobile body 108 itself. There is no reliance on the theoretical centerline or control line as established by the traverse of the assembly line. Thus, it is possible that the vertical probe 77 on one side of the automobile body may be higher than the corresponding vertical probe 77 on the other side of the automotive body. Likewise, the front to rear or longitudinal probe 73 on one side may be at a station more advanced than the corresponding front to rear probe 73 that is established on the other side of the automobile body. The action of each overall apparatus 10 is such that a datum in space is established on each side of the automobile body. In the apparatus as shown in FIG. 8, the two points in space, as dictated by the automobile body itself, have been selected by and retained by the overall apparatuses 10. The bridge member 121 is lowered along the two pairs of rails 122 and 123 that are vertically aligned and attached to the columnar members 118 and 120. The tool and support frameworks 126 and 124 are lowered along with the bridge member 121. The tool framework 126 assumes a work attitude that is unique and specific to the automobile body therebeneath. The work attitude of the tool framework 126 is controlled by the positioning bar 127 and its positioning posts 128 and 130. The lower terminal ends of the positioning posts 128 and 130 are keyed into the datum established as held by the overall assemblies that are positioned on each side of the automobile body 108. Thus, the specific work attitude assumed by the tool framework will result in hood and fender attachment points that are compatible with the adjacent sheet metal of the automobile body 108. In a similar manner, attachment holes can be positioned for other automobile body assemblies.

The method of the present invention contemplates the addressing of an automobile body or, for that matter, any other partially assembled structure, to which additional parts or assemblies of parts are to be coordinated. A single point in space or datum position is located and retained while useful work is performed on the object from which the datum position is established strictly in relation to the datum position. Additionally, a plurality of datums may be located and useful work is performed on an object strictly in relation to these datum positions. While the method of the invention has been set forth by way of illustration involving two fixed datums in space, thus, defining a reference plane, it is within the purview of the present invention to establish and immobilize any number of datum references in space, thus, creating a reference plane from which useful work can be performed.

The invention including the method and apparatus as heretofore set forth may be embodied in other specific forms without departing from the spirit or essence of the invention. The presently disclosed embodiments are, therefore, to be considered in all respects as illustrative and not as a restriction on the invention, the scope of the invention being indicated by the appended claims. Rather the foregoing description and all changes that come within the meaning and range of equivalency of the claims are to be embraced therein.

What is claimed is:

1. An apparatus for locating a position with respect to an object that is located between a plurality of gauging sites, said apparatus comprising:
  a carrier assembly that spans the direction of travel of an assembly line for said object, said carrier assembly comprising:
  at least two columnar members in spaced apart relationship on opposite sides of said assembly line; and
  a bridge member interposed between said at least two columnar members;
  means for moving said bridge member with respect to said at least two columnar members, said means for moving being located between said bridge member and said at least two columnar members;
  a plurality of position detection assemblies juxtaposed said at least two columnar members, said position detection assemblies being positioned in spaced relationship to one another to permit said assembly line to pass therebetween, said plurality of position detection assemblies mechanically engaging said object to establish locations in space when said object is therebetween;
  tool means attached to said bridge member of said carrier assembly so that work can be accomplished on a body of said object that passes in close proximity to said tool means; and
  positioning means mechanically interconnecting said tool means to said position detection assemblies for positioning said tool means relative to said locations in space so that work can be performed on said body of said object by said tool means even though said body of said object is not of symmetrical configuration.

2. The apparatus as claimed in claim 1 wherein a support framework is movably attached between said bridge member and said tool means.

3. The apparatus as claimed in claim 2 wherein a plurality of posts are utilized to attach said support framework to said bridge member.

4. An apparatus for locating a position with respect to an object that is located between a plurality of gauging sites, said apparatus comprising:

a carrier assembly that spans the transverse direction of an assembly line for said object, said carrier assembly comprising:
at least two columnar members spaced from the linear direction of travel of said object along said assembly line;
a bridge member interposed between said at least two columnar members, said bridge member aligned in a generally horizontal attitude;
a plurality of rails attached to said at least two columnar members, said plurality of rails being oriented parallel to one another to permit travel of said bridge member while it remains generally horizontal;
a mechanical position detection assembly positioned adjacent to each said columnar member of said at least two columnar members so that said mechanical position detection assembly is adjacent said assembly line;
a support framework movably attached to said bridge member;
a tool framework attached to said support framework, said tool framework supporting a plurality of tools;
a positioning bar attached to said tool framework, said positioning bar being cantilevered in two directions and having the terminal ends thereof adjacent said mechanical position detection assemblies;
a positioning post attached to each of said terminal ends of said positioning bar; and
positioning means attached to the ends of said positioning posts.

5. The apparatus as claimed in claim 4 wherein a plurality of posts are utilized to attach said support framework to said bridge member.

6. The apparatus as claimed in claim 5 wherein said support framework is of rectangular configuration.

7. The apparatus as claimed in claim 4 wherein said positioning means comprises a ball and socket.

8. An apparatus for locating a position with respect to an automobile body that is located between two gauging sites, said apparatus comprising:

a carrier assembly that spans the transverse direction of an assembly line for the manufacture of said automobile body, said carrier assembly comprising:
a pair of vertically aligned columnar members spaced equidistant from the linear direction of travel of said assembly line;
a bridge member positioned between said pair of columnar members, said bridge member aligned in a generally horizontal attitude and interconnected to said pair of columnar members by a plurality of rails that are attached to said pair of columnar members, said plurality of rails being oriented parallel to one another to permit travel of said bridge member while it maintains a generally horizontal attitude;
a mechanical position detection assembly positioned adjacent to each said columnar member of said pair of columnar members so that said mechanical position detection assembly is adjacent said columnar member and said assembly line, said mechanical position detection assemblies being capable of establishing a location in space as dictated by an automobile body interposed therebetween;
a plurality of spaced apart posts attached to said bridge member, said plurality of spaced apart posts being aligned in a generally vertical direction;
a support framework of generally rectangular configuration movably attached to the ends of said plurality of posts most remote from said bridge member, said support framework positioned in a generally horizontal attitude;
a tool framework attached to said support framework so that it can move relative to said bridge member, said tool framework also being of generally rectangular configuration;
a plurality of tools attached to said tool framework in spaced apart relationship to one another;
a positioning bar attached to one side of said tool framework, said positioning bar extending in cantilevered fashion in a generally horizontal direction outward from said tool framework so that the terminal ends of said positioning bar are adjacent each of said mechanical position detection assemblies;
a positioning post attached to each of said terminal ends, said positioning posts arranged generally parallel to one another and having their free ends terminate near said mechanical position detection assemblies; and
a ball and socket arrangement for coupling the free ends of said positioning posts to said respective mechanical position detection assemblies.

* * * * *

UNITED STATES PATENT AND TRADEMARK OFFICE
CERTIFICATE OF CORRECTION

PATENT NO. : 4,976,026
DATED : December 11, 1990
INVENTOR(S) : Ernest A. Dacey, Jr.

It is certified that error appears in the above-identified patent and that said Letters Patent is hereby corrected as shown below:

Column 1, line 14, delete "Invention" and insert ---- invention ----.

Column 3, line 65, delete ":" and insert ---- ; ----.

Column 4, line 2, delete "6" and insert ---- 5 ----.

Column 4, line 29, after "ways" insert a comma ---- , ----.

Column 4, line 60, after "actuator" insert ---- 25. ----.

Column 5, line 48, delete "48" and insert ---- 43 ----.

Column 7, line 34, delete "panel" and insert ---- Panel ----.

Column 8, line 12, delete "croas" and insert ---- cross ----.

Column 8, line 36, delete "too" and insert ---- tool ----.

Column 12, line 31, after "as" delete the comma ",".

Column 12, line 47, delete "pIerce" and insert ---- pierce ----.

UNITED STATES PATENT AND TRADEMARK OFFICE
CERTIFICATE OF CORRECTION

PATENT NO. : 4,976,026

DATED : December 11, 1990

INVENTOR(S) : Ernest A. Dacey, Jr.

It is certified that error appears in the above-identified patent and that said Letters Patent is hereby corrected as shown below:

Column 14, line 44, please insert an additional paragraph indention.

Column 14, line 46, please insert an additional paragraph indention.

Signed and Sealed this

Sixteenth Day of June, 1992

*Attest:*

DOUGLAS B. COMER

*Attesting Officer*     Acting Commissioner of Patents and Trademarks